UNITED STATES PATENT OFFICE.

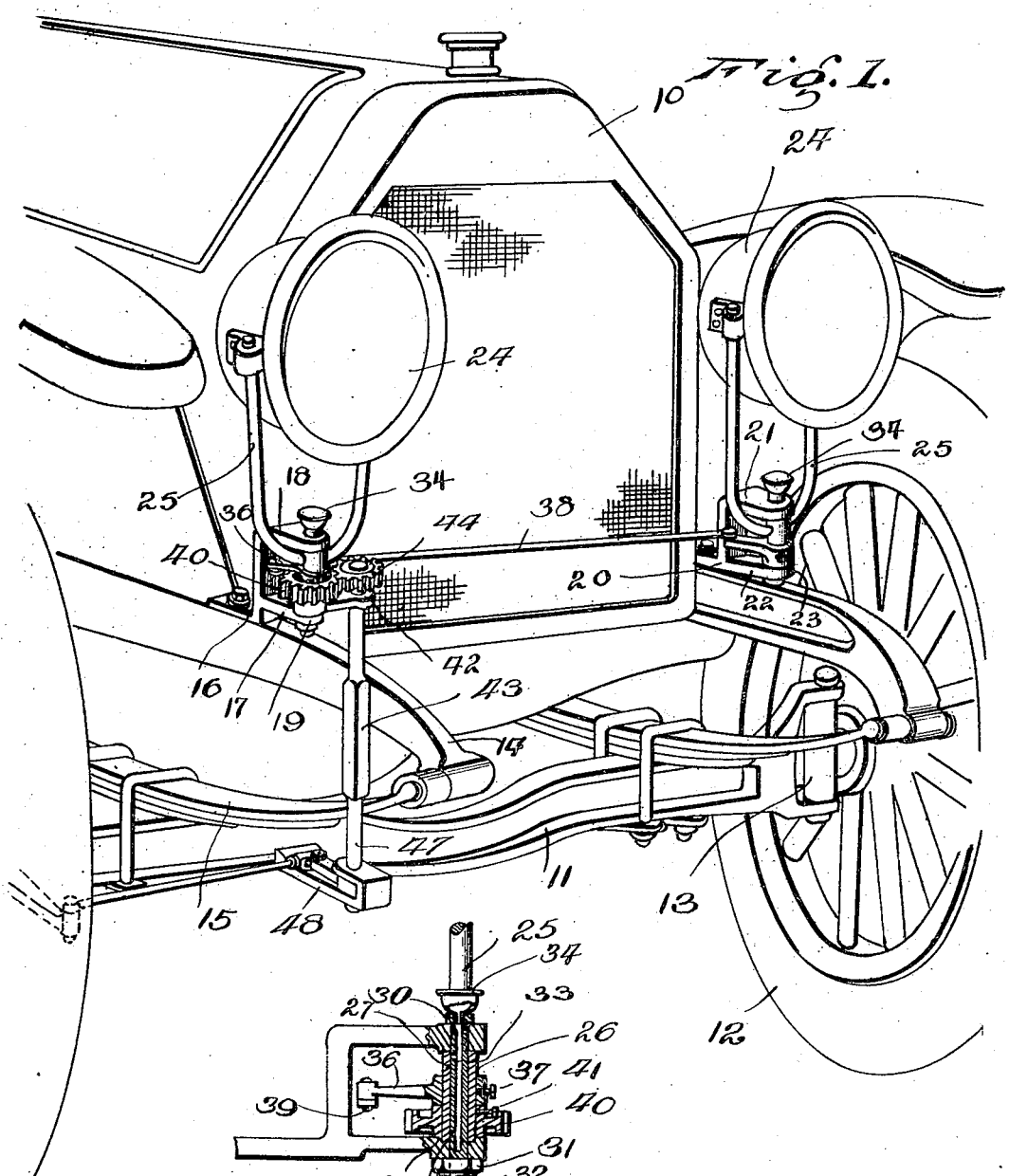

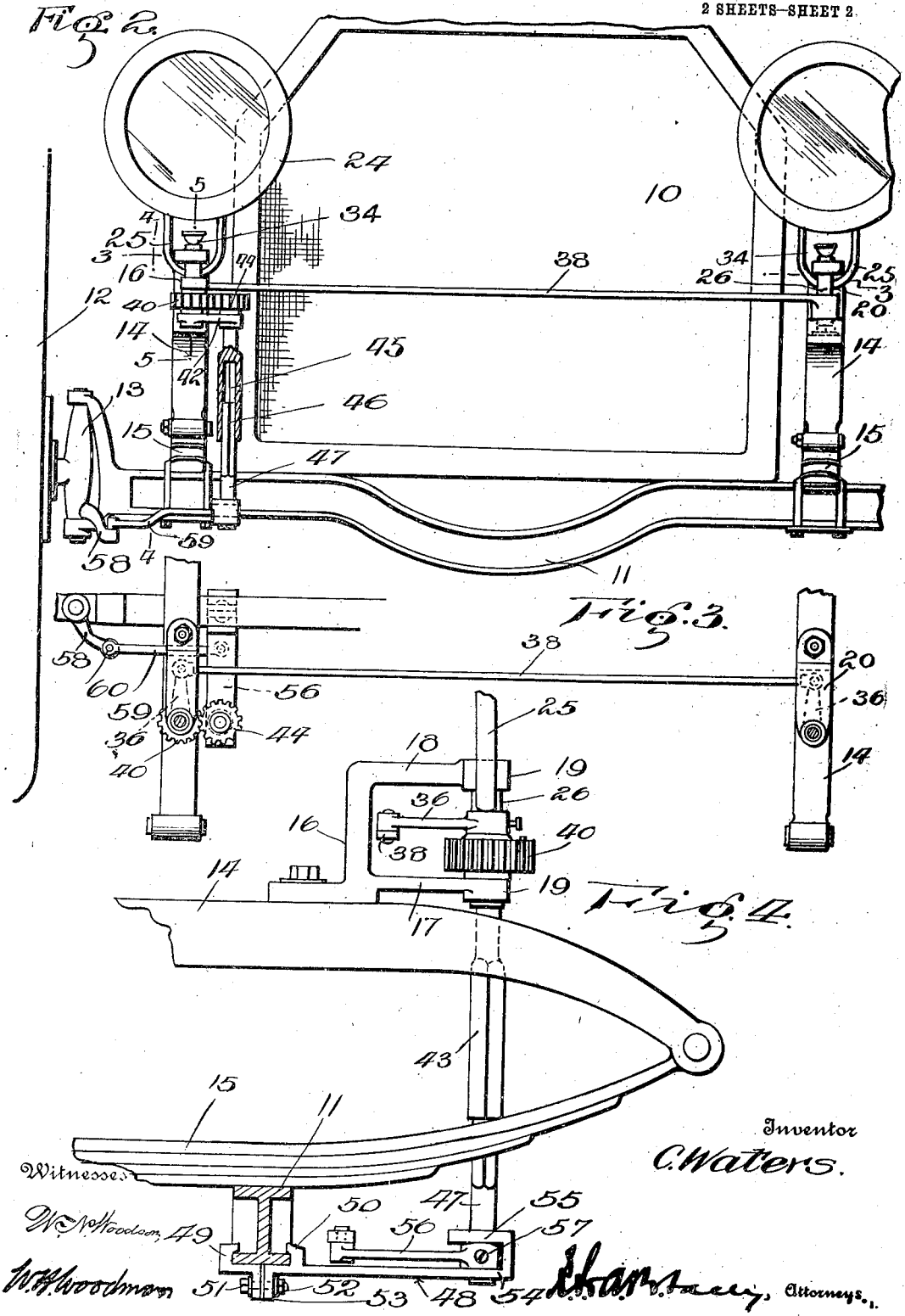

CLIFTON WATERS, OF BROOKFIELD, MISSOURI.

DIRIGIBLE-HEADLIGHT MECHANISM.

1,130,357.

Specification of Letters Patent.

Patented Mar. 2, 1915.

Application filed May 5, 1914. Serial No. 836,487.

*To all whom it may concern:*

Be it known that I, CLIFTON WATERS, citizen of the United States, residing at Brookfield, in the county of Linn and State of Missouri, have invented certain new and useful Improvements in Dirigible-Headlight Mechanism, of which the following is a specification.

My invention relates to new and useful improvements in dirigible headlights for vehicles, particularly vehicles of the self-propelled type, the primary object of my invention being the provision of a simple mechanism coacting between one of the steering knuckles of the vehicle and the headlights to cause simultaneous turning movement of the headlights and steering wheels.

A further object of my invention is to provide a mechanism so arranged as to compensate for any vertical movement of the headlights with respect to the front axle of the vehicle, due to the action of the suspension springs of the vehicle body.

A still further object of my invention is the provision of a novel means for attaching headlight carrying forks to the operating mechanism, said means including a bolt of the self-lubricating type so arranged as to lubricate the supporting bearings of the mechanism.

A still further object of my invention is the provision of a headlight operating mechanism in which the power transmission depends upon intermeshing gears rather than upon a complicated system of slotted lever arms, cranks and other mechanical elements commonly employed for this purpose.

With these and other objects in view, my invention will be more fully described, illustrated in the drawings, which disclose the preferred embodiment thereof and then specifically pointed out in the claims which are attached to and form a part of this application.

In the drawings, Figure 1 is a fragmentary perspective view of a conventional form of automobile showing my headlight operating mechanism in use; Fig. 2 is a front elevation of the structure shown in Fig. 1, part of the operating mechanism for the headlights being shown in section; Fig. 3 is a transverse sectional view taken on the line 3—3 of Fig. 2 looking downwardly; Fig. 4 is a vertical sectional view taken on the line 4—4 of Fig. 2; Fig. 5 is a detail sectional view taken on the line 5—5 of Fig. 2.

Corresponding and like parts are referred to in the following description and indicated in all the views of the drawings by the same reference characters.

In order to insure a clear and full understanding of my invention and its operation, I have illustrated it in connection with a conventional form of automobile 10 having a forward axle 11 and steering wheels 12 pivotally connected to the axle through the medium of the usual steering knuckles 13, the knuckles being pivoted for swinging movement about a vertical axis in heads formed at the ends of the axle. The forward portion of the body of the automobile is suitably supported by side frame members 14 connected to semi-elliptical springs 15 carried by the forward axle. As the above described structure is of a conventional type any further description thereof is deemed unnecessary.

Secured to one of the side frame members 14 of the vehicle is a substantially L-shaped lamp bracket 16, the up-standing portion of which is provided with vertically spaced, forwardly extending arms 17 and 18 provided adjacent their forward ends with alined bearings 19. A similar bracket 20, having spaced arms 21 and 22 provided with bearings 23, is mounted upon the opposite frame member of the vehicle in transverse alinement with the first, these brackets serving as supports for the headlights 24, which may be of any desired type. These headlights are carried by the lamp-carrying forks 25, which are of the usual type, with the exception that the standard portions 26 of the forks are provided throughout their length with bores 27.

Each of the standard portions of the lamp-carrying forks is adapted to seat vertically between the spaced arms of its bracket with its lower end in a circumferential groove or channel 28 formed in the upper face of the lower arm, the bracket being sufficiently resilient to permit proper assembling of the parts in the above manner. Pivot pins or bolts 29 having heads 30 pass downwardly through the brackets and through the bores of the standards and are secured in place by nuts 31 which are in turn locked by cotter pins 32. These bolts are provided with longitudinally extending bores or lubricant passages 33 which terminate short of their lower ends and which extend through the heads, being thereby counterbored to receive the threaded nipples of lubricant cups 34. These lubricant passages are provided at intervals with radial extensions 35 by means of which the lubricant may pass through the bearing surfaces of the standards and pivot bolts.

Crank arms 36 are mounted upon the upper portions of the fork standards and secured against turning movement thereon by set bolts 37, or other suitable fastening devices. The free ends of these crank arms are pivotally connected to the ends of the connecting rod 38 by self-lubricating pivot pins 39, this connecting rod being of such length that the crank arms 37 may be extended rearwardly to bring the reflectors of the lamps in a common plane parallel to the front axle of the car. A spur gear 40 is also mounted upon one of the fork standards immediately below its crank arm 37 and secured in place by a set bolt 41.

That bracket journaling the standard carrying the spur gear 40, which in the drawings is the bracket 16, has its lower arm 17 extended inwardly at right angles to form a bearing 42, in which is journaled a vertically disposed shaft 43 carrying at its upper end a spur gear 44 meshing with the spur gear 40. The lower end of this shaft 43 is preferably slightly enlarged and in any event provided with a squared socket 45 to receive the squared upper terminal 46 of a shaft 47, the shaft 47 being journaled for rotation in the spaced arms of a bracket 48 carried by the forward axle. This bracket includes co-acting clamp members 49 and 50 adapted to be secured to the axle by a nut 51 and bolt 52 passed through their mating ears 53. One of these clamp members is provided with a forwardly directed portion having an upwardly and rearwardly directed terminal providing the spaced arms 54 and 55, in which the shaft section 47 is journaled. A crank arm 56 is carried by that portion of the shaft section 47 extending between these arms, being secured against turning movement independent of the shaft section 47 by the set bolt 57. The adjacent steering knuckle 13 is provided with a forwardly extending arm 58 and a rod 59 is pivotally connected at its ends to the free ends of the arms 56 and 58 by self-lubricating pivot pins 60. This rod should, of course, be so proportioned that when the wheels of the vehicle are directed straight ahead, as shown in Figs. 1 and 2 of the drawings, the lamps will also be directed straight ahead.

From the foregoing description, taken in connection with the drawings, the operation of my improved headlight actuating mechanism will be readily understood. It will be clear that any turning of the steering wheel, the knuckle of which carries the arm 58, will act through said arm and the rod 59 to swing the crank arm 56 and, consequently, turn the shaft formed by the shaft sections 43 and 47 and so turn the gear 44. This gear 44, meshing as it does with the gear 40, will cause a corresponding turning of that headlight whose fork standard carries said gear. This turning of one headlight will act through the rod 38 to cause a corresponding turning of the other headlight. For this reason the reflectors of the headlights will always lie in a plane or planes perpendicular to the planes of the steering wheels. The telescopic shaft sections 43 and 47 prevent injury to the mechanism due to vertical movement of the vehicle body with respect to the forward axle 11 of the vehicle while at the same time insuring perfect transmission of all movement imparted by the arm 58 of the steering knuckle. As a matter of fact, no extreme care is necessary in the proportioning of the length of the various crank arms and connecting rods, as the proper adjustment can be made by securing the crank arms and gears upon their respective shafts in properly adjusted relation, dependent upon the proportions of the crank arms and connecting rods. The employment of the self-lubricating lamp supporting pins and the self-lubricating pivot pins for the various connections prevents undue wear of the parts, which would otherwise occur in a mechanism so constantly in use, and also renders the operation of the mechanism noiseless.

Although I have illustrated and described my invention in all its details of construction, it will, of course, be understood that I do not wish to, in any way, limit myself to such details, as various changes within the scope of the appended claims may be made at any time, if desired, without in the slightest degree departing from the spirit of my invention.

Having thus described the invention, what is claimed as new is:

1. A dirigible headlight for motor vehicles including a bracket adapted for attachment to a vehicle frame and having vertically spaced arms, a lamp supporting fork having a standard rotatably mounted between the arms, retaining means for the standard, and means adapted for operative connections between a steering knuckle of the vehicle and such standard for causing synchronous movement of the two.

2. A dirigible headlight for motor vehicles including a bracket adapted for attachment to a vehicle frame and having vertically spaced arms, a lamp supporting fork having a standard rotatably mounted between the arms, a gear carried by the standard, and means adapted for operative connections between a steering knuckle of the vehicle and such gear for causing synchronous movement of the two, said means including a shaft journaled in the bracket, a gear carried by such shaft and meshing with the first gear, a second bracket adapted for attachment to the vehicle axle, a shaft journaled in said second bracket and having sliding telescopic engagement with the before-mentioned shaft, an arm carried by the axle supported shaft, and a link pivotally connected to the arm and adapted for pivotal connection to a steering knuckle carried arm.

3. A dirigible headlight for motor vehicles including a bracket adapted for attachment to a vehicle and having vertically spaced arms, a lamp supporting fork having a standard rotatably mounted between the arms, a pin extending through the arms and standard and provided with a lubricant chamber opening through its upper end and side walls, means for supplying lubricant to the chamber, a gear on the shaft, and means operatively engaging the gear and adapted for connection to the steering knuckle of the vehicle.

4. A dirigible headlight for motor vehicles including a bracket adapted for attachment to a vehicle and having vertically spaced arms, a lamp bracket including a tubular body portion adapted to be positioned between the arms, pivotal fastening means extending through the arms and bore of the lamp bracket, and means co-acting between the lamp bracket and steering knuckle for turning the bracket.

5. A dirigible headlight for motor vehicles including a bracket adapted for attachment to a vehicle and having vertically spaced arms, the lower of said arms having a circular recess in its upper face, a lamp bracket including a tubular standard portion insertible between the arms with its lower end seating in the recess of the lower arm, a gear carried by the standard, means adapted for operative connection between the steering knuckle of a vehicle, and standard, and means for securing the lamp bracket against displacement.

6. A dirigible headlight for motor vehicles including a bracket adapted for attachment to a vehicle and having vertically spaced arms, the lower of said arms having a circular recess in its upper face, a lamp bracket including a tubular standard portion insertible between the arms with its lower end seating in the recess of the lower arm, means adapted for operative connection between the steering knuckle of a vehicle, and standard, and means for securing the lamp bracket against displacement, said means including a bolt passed through the arms of the first bracket and through the tubular portion of the lamp bracket.

In testimony whereof I affix my signature in presence of two witnesses.

CLIFTON WATERS. [L. S.]

Witnesses:
P. E. QUICK,
J. A. McLEAN.